(12) United States Patent
Peres et al.

(10) Patent No.: US 10,303,528 B1
(45) Date of Patent: May 28, 2019

(54) PARALLEL PROCESSING OF EVENTS HAVING MULTI-DIMENSIONAL DEPENDENCIES

(71) Applicant: EMC IP Holding Company LLC, Hopkinton, MA (US)

(72) Inventors: Mikael Peres, Raanana (IL); Yariv Amar, Ramla (IL); Oded Peer, Ranana (IL); Tomer Meidan, Ramat-Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 235 days.

(21) Appl. No.: 14/865,488

(22) Filed: Sep. 25, 2015

(51) Int. Cl.
  *G06F 9/54* (2006.01)

(52) U.S. Cl.
  CPC .............. *G06F 9/542* (2013.01); *G06F 9/546* (2013.01)

(58) Field of Classification Search
  None
  See application file for complete search history.

(56) References Cited

U.S. PATENT DOCUMENTS

| | | | |
|---|---|---|---|
| 7,509,653 B2 | 5/2009 | Das et al. | |
| 8,156,364 B2 | 4/2012 | Ratakonda et al. | |
| 2005/0166187 A1* | 7/2005 | Das | G06F 9/546 717/136 |
| 2008/0112439 A1* | 5/2008 | Vestal | H04J 3/0661 370/516 |
| 2008/0134158 A1* | 6/2008 | Salz | G06F 8/41 717/148 |
| 2010/0005479 A1* | 1/2010 | Avasthi | G06F 1/3203 719/318 |
| 2010/0070975 A1* | 3/2010 | Barker | G06F 9/542 718/102 |
| 2011/0041133 A1* | 2/2011 | Amini | G06F 9/542 718/102 |
| 2011/0067036 A1* | 3/2011 | Hickford | G09B 29/00 719/314 |
| 2015/0317295 A1* | 11/2015 | Sherry | G06F 17/218 715/226 |
| 2016/0034324 A1* | 2/2016 | Liu | G06F 9/542 719/318 |

* cited by examiner

Primary Examiner — Tuan C Dao
Assistant Examiner — William C Wood
(74) Attorney, Agent, or Firm — Ryan, Mason & Lewis, LLP

(57) ABSTRACT

Parallel processing of events having multi-dimensional dependencies is provided. Each event has at least one profile and each profile has at least one profile key. An event is dependent on another event if they have at least one common profile key. The profile key(s) for a plurality of profiles of the given event are compared to profile keys of previously queued events. A given event is assigned to a same queue as at least one dependent event. When a given event is dependent on events in at least two queues, the given event is not assigned to a queue until only one queue has dependent events remaining to be processed. A list of profile keys that have been assigned to each queue and/or a reference count of a number of events that have been queued for each profile key are optionally maintained.

20 Claims, 4 Drawing Sheets

| EVENT ID 205 | TIME STAMP 210 | PROFILE KEYS 220 | | | ASSIGNED QUEUE 250 |
|---|---|---|---|---|---|
| | | USER ID 220-1 | IP 220-2 | COOKIE 220-3 | |
| e1 | t1 | u1 | 1.1.1.1 | aaa | Q1 |
| e2 | t2 | u2 | 2.2.2.2 | bbb | Q2 |
| e3 | t3 | u1 | 3.3.3.3 | ccc | Q1 |
| e4 | t4 | u3 | 1.1.1.1 | ddd | Q1 |
| ... | ... | ... | ... | ... | ... |
| eN-1 | tN-1 | u4 | 2.2.2.2 | bbb | Q2 |
| eN | tN | u2 | 4.4.4.4 | aaa | WAIT |

US 10,303,528 B1

PARALLEL PROCESSING OF EVENTS HAVING MULTI-DIMENSIONAL DEPENDENCIES

FIELD OF THE INVENTION

The field relates generally to event processing, and more particularly to parallel processing of events that include dependent events.

BACKGROUND OF THE INVENTION

A Complex Event Processing (CEP) engine is a tool that processes events based on an order in which they occurred. CEP tools are commonly used for research and analysis, such as an evaluation of how a change in a particular algorithm will affect an overall system. Existing techniques process the events in a single thread to ensure that the order of events is predictable and consistent. Single thread processing, however, is not scalable and can take several days when processing large amounts of data. Multiple threads running in parallel, however, may cause events to run "out-of-order," leading to unpredictable system behavior.

A need therefore exists for techniques for processing sequences of events in parallel while ensuring that dependent events are processed based on an order of occurrence.

SUMMARY OF THE INVENTION

One or more illustrative embodiments of the present invention provide methods and apparatus for parallel processing of events having multi-dimensional dependencies. In accordance with one embodiment of the invention, a method is provided comprising the steps of obtaining a plurality of events, wherein each of the plurality of events comprises at least one profile, wherein each profile comprises at least one profile key; for a given event, determining if the given event is dependent on another event by comparing the at least one profile key for a plurality of profiles of the given event to profile keys of previously queued events, wherein two events are dependent if they have at least one common profile key; and assigning the given event to one of a plurality of queues such that the given event is assigned to a same queue as at least one dependent event.

In one or more exemplary embodiments, when a given event has at least one profile key in common with two or more events currently pending in two or more of the plurality of queues, the exemplary method further comprises the steps of waiting until only a given one of the plurality of queues has at least one of the two or more events remaining to be processed; and assigning the given event to the given one of the plurality of queues.

In at least one embodiment, data objects are maintained comprising a list of profile keys that have been assigned to each of the plurality of queues and/or a reference count of a number of events that have been queued for each profile key. The data objects are updated for each new event assigned to each of the plurality of queues.

The methods and devices of the illustrative embodiments overcome one or more of the problems associated with the conventional techniques described previously, and provide for parallel processing of events while ensuring that dependent events are processed based on an order of occurrence. These and other features and advantages of the present invention will become more readily apparent from the accompanying drawings and the following detailed description.

DETAILED DESCRIPTION OF PREFERRED EMBODIMENTS

Illustrative embodiments of the present invention will be described herein with reference to exemplary communication, storage and processing devices. It is to be appreciated, however, that the invention is not restricted to use with the particular illustrative configurations shown. Aspects of the invention provide methods and apparatus for parallel processing of events having multi-dimensional dependencies such that dependent events are processed based on an order of occurrence.

As will be described, the present invention in one or more illustrative embodiments provides techniques for parallel processing of events having multi-dimensional dependencies. In one or more exemplary embodiments, dependent events are identified based on event profiles and profile keys of the events. As used herein, a multi-dimensional event dependency occurs when a given event has a profile key for a plurality of profiles of the given event in common with profile keys of other events.

In one or more exemplary embodiments, events are assigned to a queue based on multi-dimensional dependencies and are processed in parallel to reduce the processing time. For example, a given sequence of events can be divided into smaller independent sequences of events based on event profiles and profile keys of the events. In this manner, sequences of events can be processed in parallel with dependent events being processed based on an order of occurrence.

In one or more exemplary embodiments, each event comprises at least one profile, and each profile comprises at least one profile key. An exemplary set of profile keys is discussed further below in conjunction with FIG. 2. For example, in the case of electronic transaction events, each event comprises one or more of a user profile having a user identifier profile key (or an organization identifier profile key); an Internet Protocol (IP) profile having an IP address profile key; a cookie profile having a cookie profile key; and a device fingerprint profile comprised of multiple device elements. According to one aspect of the invention, a given event is classified as dependent on another event by comparing at least one profile key for a plurality of profiles of the given event to profile keys of previously queued events. Two events are considered dependent if they have at least one common profile key.

Figure 1:
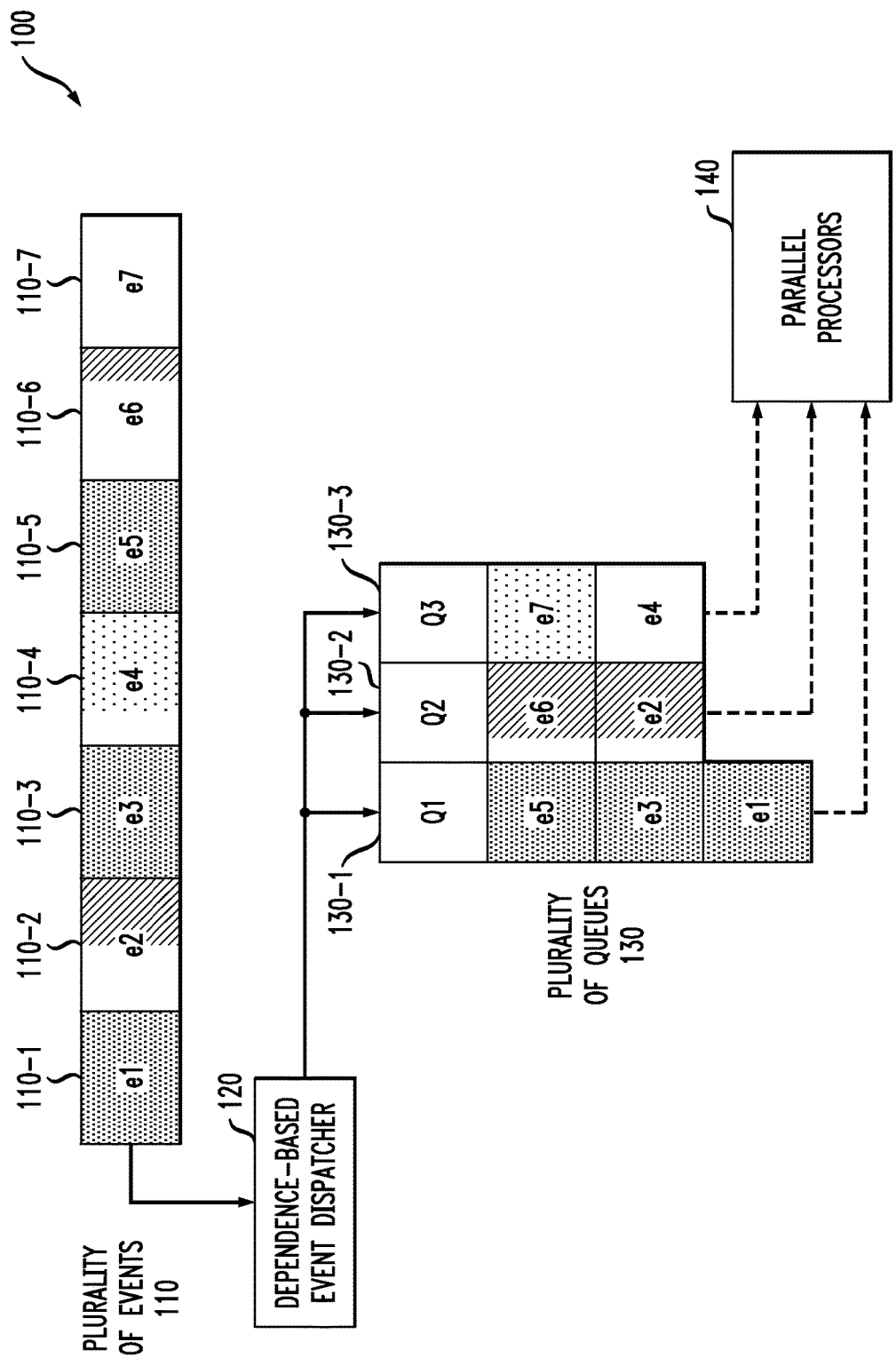
FIG. 1 illustrates a plurality of events being assigned to one of a plurality of queues by a dependence-based event dispatcher in accordance with an exemplary embodiment of the invention.

FIG. 1 illustrates a plurality of events 110 being assigned to one of a plurality of queues 130 by a dependence-based event dispatcher 120 in accordance with an exemplary embodiment 100 of the invention. As shown in FIG. 1, the exemplary dependence-based event dispatcher 120 assigns each event 110-$i$ from the plurality of events 110 to one of a plurality of queues 130-1 through 130-3, such as exemplary queues Q1 through Q3. The dependence-based event dispatcher 120 assigns each event 110-$i$ to one of the queues 130 using a dependence-based event queue assignment process 400, discussed further below in conjunction with FIG. 4.

In the example of FIG. 1, events 110-1, 110-3, and 110-5 are classified as dependent events and are thus assigned to the same queue 130-1 so that the events are processed in sequence in the same thread. Likewise, events 110-2 and 110-6 are classified as dependent events and thus are assigned to the same queue 130-2 so that the events are processed in sequence in the same thread. Finally, events 110-4 and 110-7 are not dependent on other events and do not have to be processed chronologically. Thus, events 110-4 and 110-7 can be assigned to any queue 130. In one exemplary embodiment, events without any dependencies can be assigned to a queue with a least number of pending events, such as queue 130-3 in FIG. 1.

As shown in FIG. 1, the independent sequences of events from each queue 130 are processed in parallel threads by a plurality of parallel processors 140, for example, using a first-in-first-out approach. In this manner, all dependent events are processed sequentially.

The dependence-based event dispatcher 120 may be implemented as any kind of computing device, such as, for example, a personal computer, a workstation, a server, an enterprise server, a laptop computer, a mobile computer, a smart phone or a tablet computer.

As noted above, a given event is classified as dependent on another event by comparing at least one profile key for a plurality of profiles of the given event to profile keys of previously queued events. Two events are considered dependent if they have at least one common profile key.

Figures 2, 3:
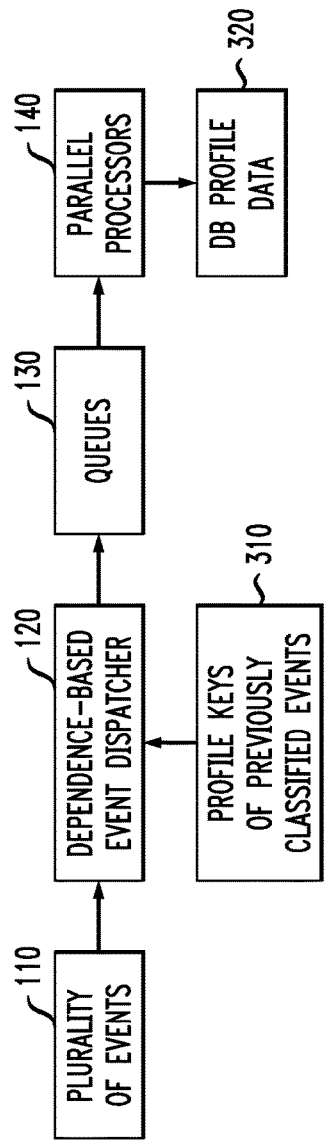
FIG. 2 illustrating an exemplary event database in accordance with an embodiment of the invention.
FIG. 3 is a block diagram illustrating a plurality of events being assigned to one of a plurality of queues by the dependence-based event dispatcher of FIG. 1.

FIG. 2 illustrates an exemplary event database 200 in accordance with an embodiment of the invention. As shown in FIG. 2, for each event identified by an identifier in field 205, the exemplary event database 200 records a time stamp 210, a plurality of exemplary profile keys 220 and optionally an indication of the assigned queue 130 in field 250.

The exemplary events in the event database 200 are ordered by timestamp. The timestamp, comprised of a date and time of the transaction, is important to calculate the profile correctly. To compare different models, the dependent transactions must keep the same order according to the date and time of the event.

For an exemplary case of electronic transaction events, the event database 200 provides the following exemplary profiles and profile keys 220: a user profile having a user identifier profile key 220-1 (or an organization identifier profile key); an Internet Protocol (IP) profile having an IP address profile key 220-2; and a cookie profile having a cookie profile key 220-3.

As used herein, a "profile" is a collection of historical and statistical attributes (e.g., profile facts) for individuals or business entities. Each profile is identified by a "profile key" which is, for example, a hash value of one or more attributes of the event, such as an account number, an IP address, a subscriber identity module (SIM) number, or a Hypertext Transfer Protocol (HTTP) User-Agent header value. Every event potentially relates to more than one profile (a user, an IP, a cookie, a fingerprint value), and thus there is more than one hash value by which to partition.

In the example of FIG. 2, events e1 and e3 are correlated since they were performed by the same user (u1). In addition, events e1 and e4 are correlated since they were performed using the same IP address (1.1.1.1). Event e2 is not correlated to the other events since it does not have a common profile key with any other event.

Since event e1 is dependent on both events e3 and e4, these three events 110 need to be processed in order (e.g., by a single thread), while event e2 can be processed by another thread and make better use of the system resources to reduce processing time.

The profile keys of each event that has been assigned to each queue 130 are maintained so that subsequent events can be assigned to queues 130 based on the profile keys of previously classified events.

One skilled in the art will appreciate that there are many different combinations of profiles and profile keys and those presented in FIG. 2 are merely exemplary.

FIG. 3 is a block diagram illustrating a plurality of events 110 being assigned to one of a plurality of queues 130 by the dependence-based event dispatcher 120 in a similar manner as described above in conjunction with FIG. 1. As shown in FIG. 3, the dependence-based event dispatcher 120 assigns events 110 to queues 130 by comparing the profile keys of each event 110-$i$ to a pool 310 of profile keys for each queue based on previously classified events.

The dependence-based event dispatcher 120 selects a queue 130-$j$ for a given event 110-$i$ by comparing the profile keys of the given event 110-$i$ to the profile keys that were previously assigned to each queue 130-$j$ based on the profile key records 310. The pool 310 of profile keys of previously classified events comprises one or more data objects comprising a listing of the profile keys that have been assigned to each of the plurality of queues 130. The pool 310 of profile keys is updated for each new profile key assigned to each of the plurality of queues 130. Each of the plurality of queues 130 are then processed by in parallel by the parallel processors 140 to generate database profile data 320. In at least one embodiment, the pool 310 of profile keys associated with each queue is further updated for each profile key to maintain a reference count by removing those events that have been processed by the parallel processors 140 and are no longer assigned to the respective queue 130.

Figure 4:
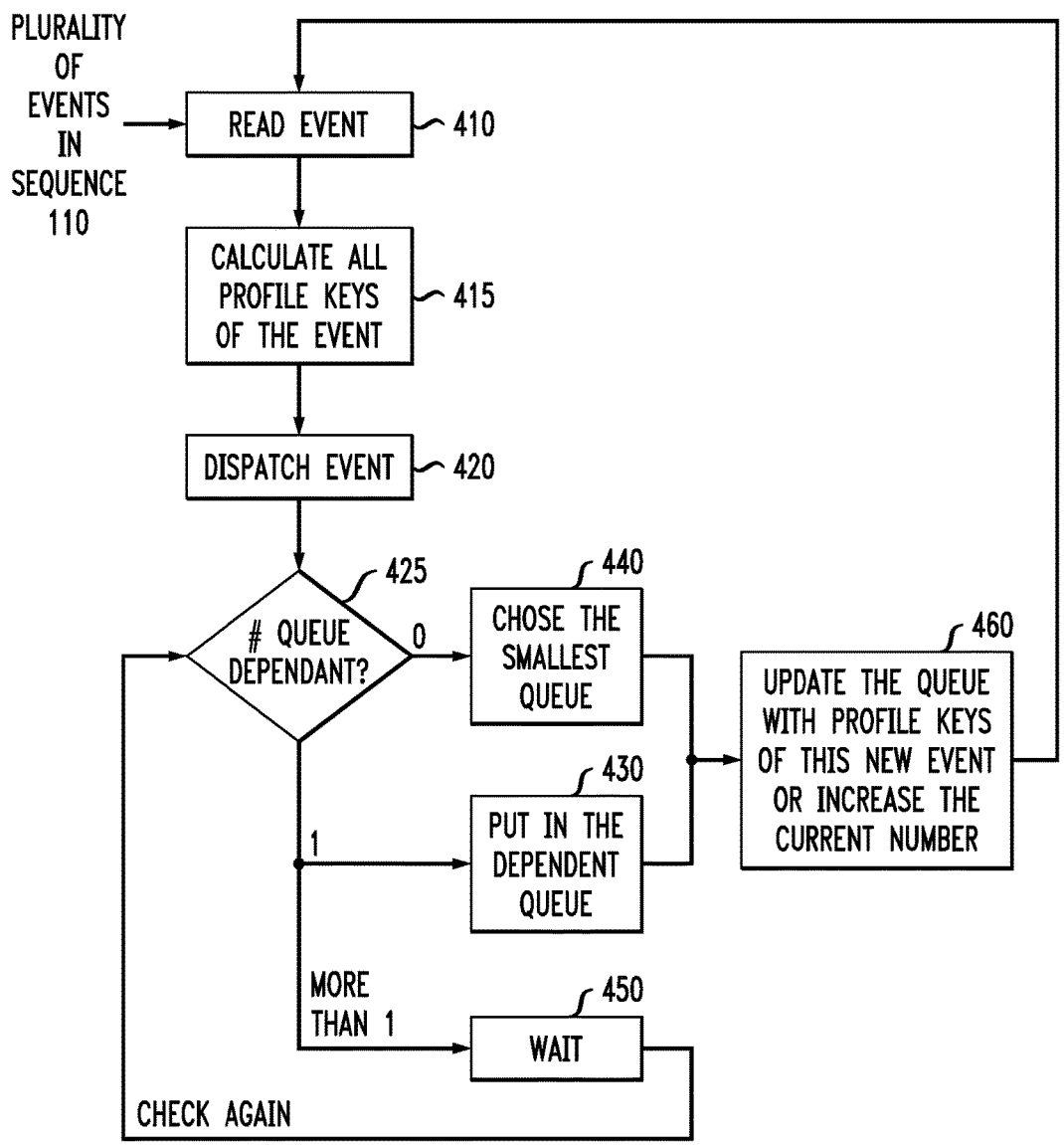
FIG. 4 is a flow chart describing an exemplary dependence-based event queue assignment process in accordance with one embodiment of the invention.

FIG. 4 is a flow chart describing an exemplary dependence-based event queue assignment process 400 in accordance with one embodiment of the invention. As shown in FIG. 4, the exemplary dependence-based event queue assignment process 400 processes the plurality of events 110. The dependence-based event queue assignment process 400 then reads a given event during step 410 and then calculates all profile keys of the event during step 415. The dependence-based event queue assignment process 400 dispatches the event to a given queue 130 based on a dependency of the event as determined by common profile keys during step 420.

A test is performed during step 425 to determine a number of queues having events on which the given event is dependent. If it is determined during step 425 that the given event is dependent on two or more of the plurality of queues 130, then the dependence-based event queue assignment process 400 waits for a predetermined period of time in step 450 before returning to step 425 to re-check the number of dependent queues. In this manner, dependent events are not processed out of order if there are common profile keys across multiple queues.

If, however, it is determined during step 425 that the given event is dependent on only one of the plurality of queues 130, then the dependence-based event queue assignment process 400 assigns the given event to the dependent queue in step 430 such that the given event is assigned to the same queue as at least one dependent event.

If, however, it is determined during step 425 that the given event is not dependent on any queue 130, then the event is assigned to the smallest queue 130 in step 440 (i.e., the queue with a least number of pending events).

As shown in FIG. 4, following the queue assignment in steps 430 or 440, the queue assignment process 400 updates the pool 310 of profile keys for the assigned queue with the profile keys of the newly added event, if needed, and increments the reference count for each profile key of the newly added event during step 460. Program control then returns to step 410 to read the next event in the plurality of events 110.

Thus, returning to FIG. 2, event eN−1 shares two common profile keys with event e2, and must be processed in queue Q2. Event eN shares one common profile key with each of two events, a common User ID with event e2 and a common cookie with e1, and must be processed in the same queue as both events, if possible, or after both dependent events with earlier timestamps have been processed. The dependence-based event dispatcher 120 will wait until either event e1 or event e2 has been processed and assign event eN to the same queue as the remaining event. For example, if event e1 is processed first in queue Q1, leaving event e2 still to be processed in queue Q2, then event eN will be assigned to queue Q2. In this manner, event eN will be processed after both dependent events e1 and e2 with earlier timestamps have been processed.

In one particular use case, different models for computer security risk engines are compared and the performance of each variation can be evaluated. Each variation comprises a different model on different data (multiple customers). Risk scores are compared using Receiver Operating Characteristic (ROC) and False Discovery Rate (FDR) curves from each load. With these graphs and the calculation of the AUC (Area under Curve) or pAUC (Partial AUC), it is possible to compare the different models and decide which one has the best performance. For a more detailed discussion of suitable techniques for evaluating risk engines, see, for example, U.S. patent application Ser. No. 13/931,135, entitled "Methods and Apparatus for Evaluating Classification Performance of Risk Engine and Models," incorporated by reference herein.

Aspects of the present invention allow the sequences of risk engine events to be processed in parallel while ensuring that dependent risk engine events are processed in order based on an order of occurrence. Thus, the required time to process the sequences of risk engine events is significantly reduced.

Figure 5:
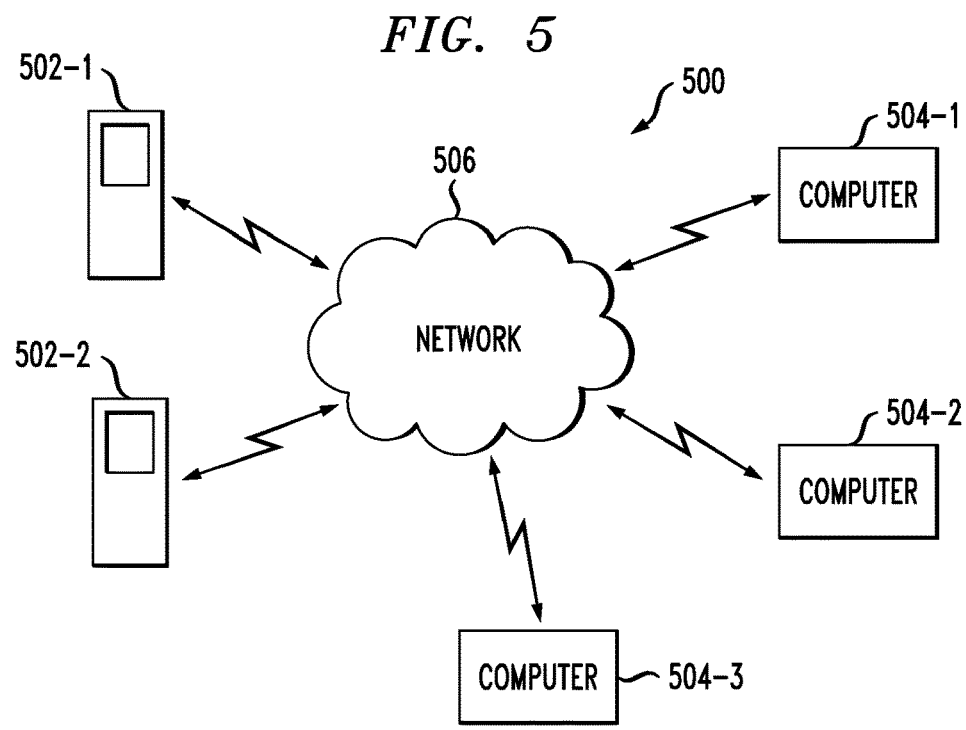
FIG. 5 is a diagram illustrating an example embodiment of communication systems that may incorporate functionality according to one or more embodiments of the invention.

FIG. 5 is a diagram illustrating an example embodiment of communication systems that may incorporate functionality according to one or more embodiments of the invention. As described herein, techniques for parallel processing of events of the type associated with one or more embodiments of the invention may be implemented in a wide variety of different applications. By way merely of illustration, one exemplary communication system application that may incorporate such techniques will now be described with reference to FIG. 5.

As depicted in FIG. 5, a communication system 500 comprises a plurality of mobile devices 502-1 and 502-2 and computers 504-1, 504-2 and 504-3, configured to communicate with one another over a network 506. Any two or more of the devices 502 and 504 may correspond to the exemplary dependence-based event dispatcher 120, queues 130 and/or parallel processors 140 in FIG. 1 and can be configured to implement at least one embodiment of the invention, as described herein. It is also to be appreciated, however, that the techniques disclosed herein can be implemented in numerous other applications. For example, while FIG. 5 depicts network 506 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, or other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 6:
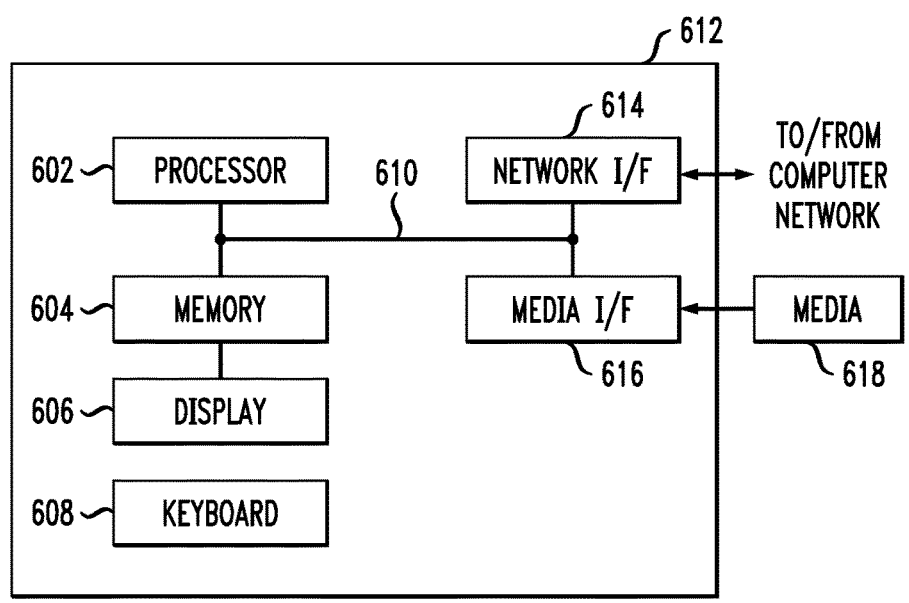
FIG. 6 is a system diagram of an exemplary device on which at least one embodiment of the invention can be implemented.

FIG. 6 is a system diagram of an exemplary device (such as the exemplary dependence-based event dispatcher 120 of FIG. 1, for example) on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from parallel processing of events. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
   obtaining a plurality of events, wherein each of said plurality of events comprises at least one profile, wherein each profile comprises at least one profile key that identifies the corresponding profile;
   for a given event, determining if said given event is dependent on another event by comparing said at least one profile key for a plurality of profiles of said given event to profile keys of previously queued events, wherein two events are dependent if they have at least one common profile key; and
   assigning said given event to one of a plurality of queues that are processed in parallel such that said given event is assigned to a same queue as at least one dependent event that shares said at least one common profile key, such that dependent events are processed based on an order of occurrence,
   wherein said given event has at least one profile key in common with two or more events currently pending in two or more of said plurality of queues, and wherein said method further comprises the steps of:
   waiting until only a given one of said plurality of queues has at least one of said two or more events remaining to be processed; and
   assigning said given event to the given one of said plurality of queues.

2. The method of claim 1, wherein each of said plurality of events further comprises a timestamp.

3. The method of claim 2, wherein at least one processor sequentially processes said events in a given one of said queues based on said timestamp.

4. The method of claim 1, wherein each event corresponds to an electronic transaction, and wherein each event comprises one or more of the following:
   a user profile having one or more of a user identifier profile key and an organization identifier profile key;
   an Internet Protocol (IP) profile having an IP address profile key;
   a cookie profile having a cookie profile key; and
   a device fingerprint profile having one or more of a plurality of device elements.

5. The method of claim 1, wherein said plurality of queues are processed by a Complex Event Processing engine.

6. The method of claim 1, wherein an event with no profile keys in common with other events is assigned to one of said plurality of queues with a least number of pending events.

7. The method of claim 1, further comprising the step of maintaining one or more data objects comprising one or more of a list of profile keys that have been assigned to each of said plurality of queues and a reference count of a number of events that have been queued for each profile key.

8. The method of claim 7, wherein said one or more data objects are updated for each new event assigned to each of said plurality of queues.

9. A system, comprising:
   a memory; and
   at least one processing device, coupled to the memory, operative to:
   obtain a plurality of events, wherein each of said plurality of events comprises at least one profile, wherein each profile comprises at least one profile key that identifies the corresponding profile;
   for a given event, determine if said given event is dependent on another event by comparing said at least one profile key for a plurality of profiles of said given event to profile keys of previously queued events, wherein two events are dependent if they have at least one common profile key; and
   assign said given event to one of a plurality of queues that are processed in parallel such that said given event is assigned to a same queue as at least one dependent event that shares said at least one common profile key, such that dependent events are processed based on an order of occurrence,
   wherein said given event has at least one profile key in common with two or more events currently pending in two or more of said plurality of queues, and wherein said at least one processing device is further operative to:
   wait until only a given one of said plurality of queues has at least one of said two or more events remaining to be processed; and
   assign said given event to the given one of said plurality of queues.

10. The system of claim 9, wherein said plurality of queues are processed by a Complex Event Processing engine.

11. The system of claim 9, wherein an event with no profile keys in common with other events is assigned to one of said plurality of queues with a least number of pending events.

12. The system of claim 9, wherein said at least one processing device is further configured to maintain one or more data objects comprising one or more of a list of profile keys that have been assigned to each of said plurality of queues and a reference count of a number of events that have been queued for each profile key.

13. The system of claim 12, wherein said one or more data objects are updated for each new event assigned to each of said plurality of queues.

14. The system of claim 9, wherein each of said plurality of events further comprises a timestamp, wherein at least one processor sequentially processes said events in a given one of said queues based on said timestamp.

15. An article of manufacture comprising a non-transitory machine readable recordable medium containing one or more programs which when executed by at least one processing device implement the steps of:

obtaining a plurality of events, wherein each of said plurality of events comprises at least one profile, wherein each profile comprises at least one profile key that identifies the corresponding profile;

for a given event, determining if said given event is dependent on another event by comparing said at least one profile key for a plurality of profiles of said given event to profile keys of previously queued events, wherein two events are dependent if they have at least one common profile key; and assigning said given event to one of a plurality of queues that are processed in parallel such that said given event is assigned to a same queue as at least one dependent event that shares said at least one common profile key, such that dependent events are processed based on an order of occurrence, wherein said given event has at least one profile key in common with two or more events currently pending in two or more of said plurality of queues, and wherein said at least one processing device further implement the steps of:

waiting until only a given one of said plurality of queues has at least one of said two or more events remaining to be processed; and assigning said given event to the given one of said plurality of queues.

16. The article of manufacture of claim 15, wherein an event with no profile keys in common with other events is assigned to one of said plurality of queues with a least number of pending events.

17. The article of manufacture of claim 15, further comprising the step of maintaining one or more data objects comprising one or more of a list of profile keys that have been assigned to each of said plurality of queues and a reference count of a number of events that have been queued for each profile key.

18. The article of manufacture of claim 17, wherein said one or more data objects are updated for each new event assigned to each of said plurality of queues.

19. The article of manufacture of claim 15, wherein each of said plurality of events further comprises a timestamp, wherein at least one processor sequentially processes said events in a given one of said queues based on said timestamp.

20. The article of manufacture of claim 15, wherein said plurality of queues are processed by a Complex Event Processing engine.

* * * * *